(No Model.) 2 Sheets—Sheet 1.
C. J. BOWLES.
COMBINED FEED RACK AND TROUGH.
No. 544,655. Patented Aug. 20, 1895.
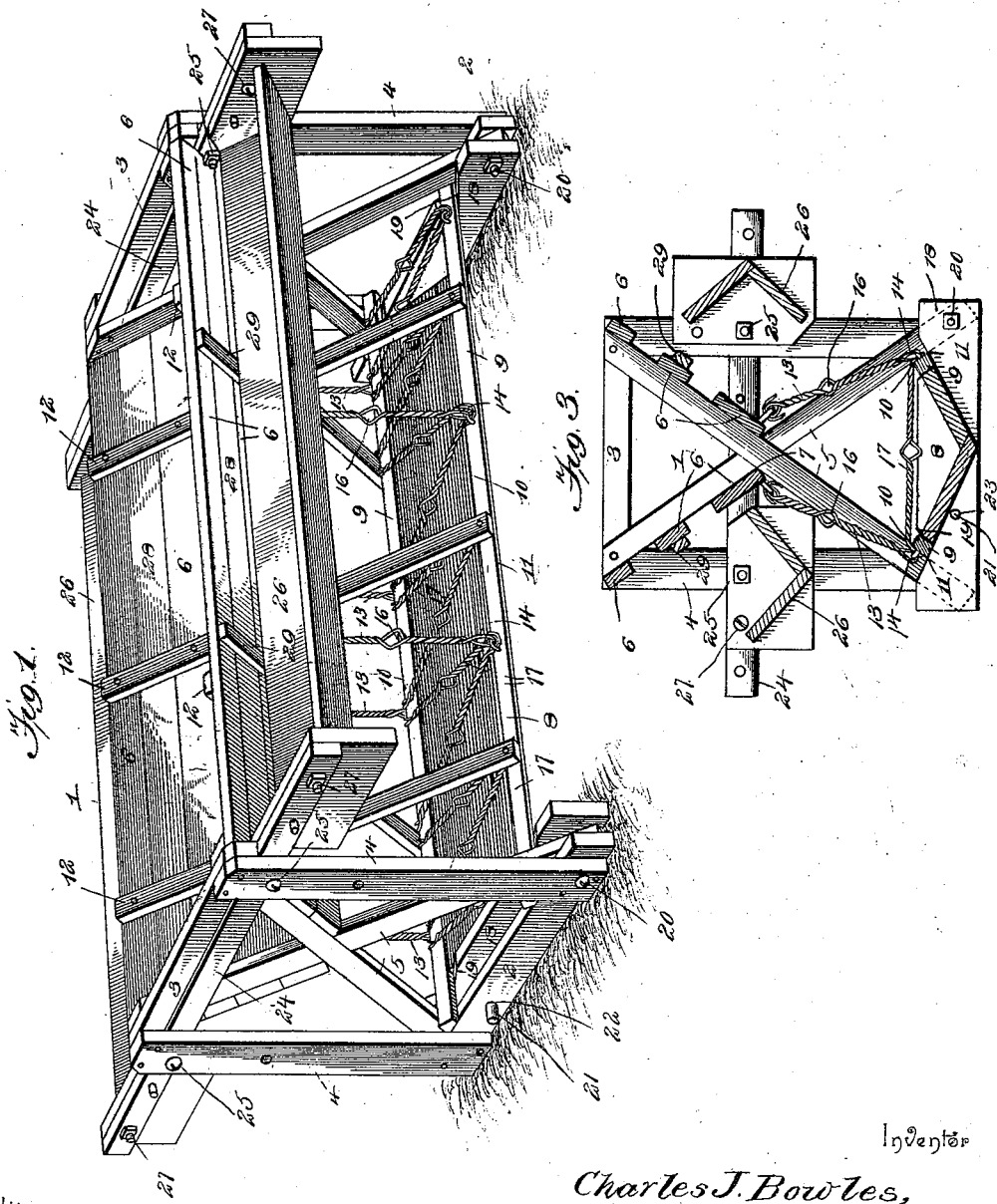
Witnesses
Inventor
Charles J. Bowles,
By Ives Attorneys.

(No Model.) 2 Sheets—Sheet 2.
C. J. BOWLES.
COMBINED FEED RACK AND TROUGH.
No. 544,655. Patented Aug. 20, 1895.
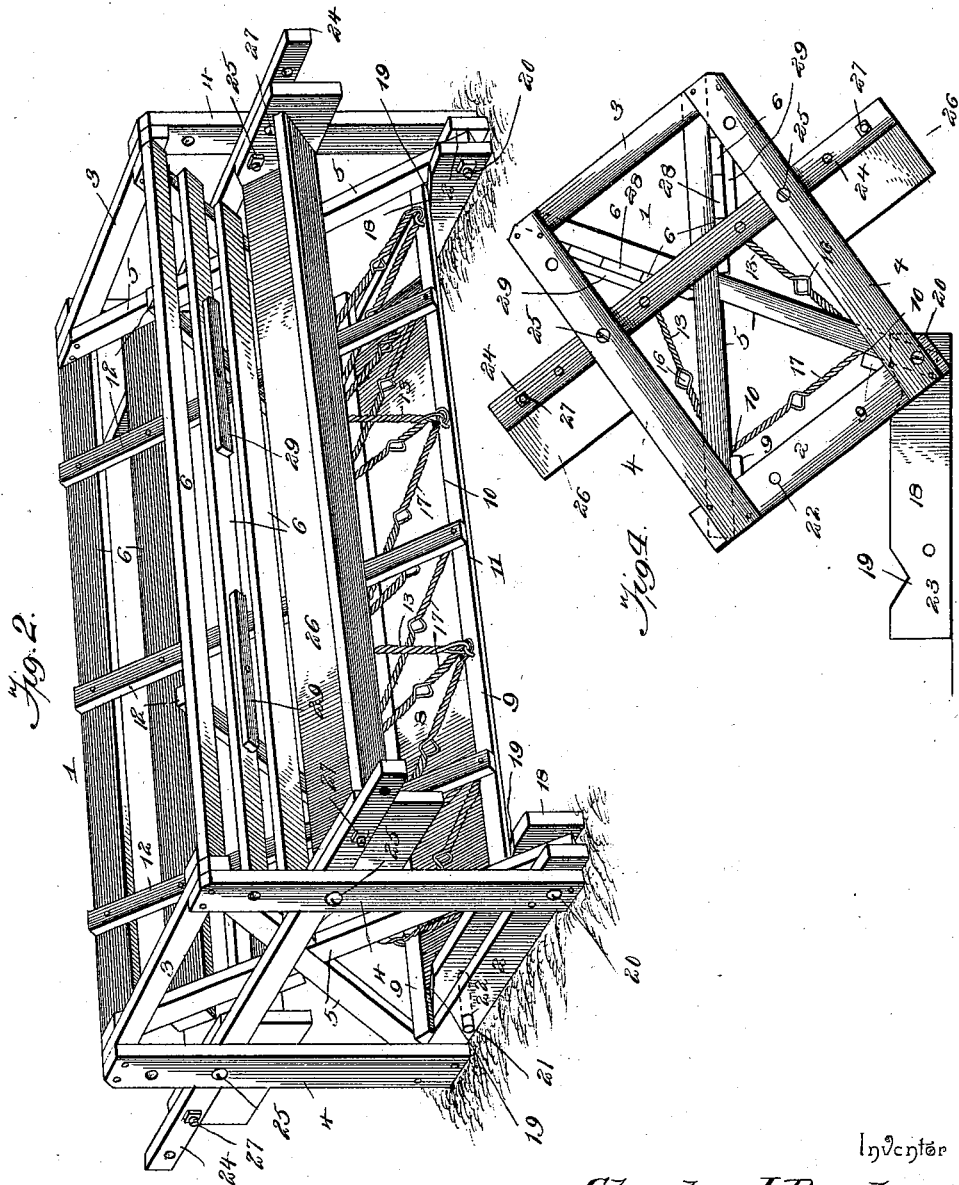

UNITED STATES PATENT OFFICE.

CHARLES J. BOWLES, OF ADA, OHIO.

COMBINED FEED RACK AND TROUGH.

SPECIFICATION forming part of Letters Patent No. 544,655, dated August 20, 1895.

Application filed November 21, 1894. Serial No. 529,468. (No model.)

*To all whom it may concern:*

Be it known that I, CHARLES J. BOWLES, a citizen of the United States, residing at Ada, in the county of Hardin and State of Ohio, have invented a new and useful Combined Feed Rack and Trough, of which the following is a specification.

My invention relates to a combined feed rack and trough adapted for general use in feeding stock, including large and small cattle, horses, sheep, hogs, &c.; and the objects in view are to provide a hog-trough which is detachably connected to the frame of a feed-rack and disposed longitudinally under a continuous opening or slot in the bottom of said rack, whereby the hog-feed may be distributed evenly throughout the trough and without detaching the rack from the trough, and in connection therewith to provide a feed-rack having filling-slats which may be inserted between the fixed slats to close the intervals therebetween, and thus prevent dust, clover-tops, broken feed, &c., from dropping from the rack upon sheep which are eating from the lower or hog trough, and to provide auxiliary troughs, located parallel with the rack and contiguous to the sides thereof, said auxiliary troughs being vertically and laterally adjustable and being adapted to hold water or small feed for large or medium sized stock.

Further objects and advantages of the invention will appear from the following description, and the novel features thereof will be particularly pointed out in the appended claims.

In the drawings, Figure 1 is a perspective view of a feed rack and trough embodying my invention, the auxiliary troughs being adjusted near the top of the rack to contain water or small feed for large stock and the filling-slats being in place to prevent clover-tops, grass-seed, and broken hay and fodder from dropping upon small stock which may be feeding from the lower trough. Fig. 2 is a perspective view of the feed rack and trough with the auxiliary troughs arranged near the bottom of the rack and under the sides thereof, to catch clover-tops, grass-seed, and broken feed which escape through the intervals between the fixed slats of the rack, the filling-slats being omitted. Fig. 3 is a vertical transverse section showing one of the auxiliary troughs detached at its inner edge and swung down for the purpose of cleaning. Fig. 4 is an end view showing the rack and supporting-frame inclined or tilted to expose the lower trough.

Similar numerals of reference indicate corresponding parts in all the figures of the drawings.

The rack 1 is supported by means of end frames, each of which comprises a base bar 2, a top bar 3, and uprights 4, and which connect said base and top bars. The uprights 4, secured to the outer surfaces of the base and top bars and secured to the inner surfaces of said base and top bars, are the extremities of the intersecting inclined bars 5, which combine to form X-standards, and therefore said X-standards are arranged in planes parallel with and spaced from the uprights which connect the base and top bars of the end frames. Secured to the outer sides of the portions of the X-standards, above the intersections of the bars forming said standards, are fixed slats 6, the lowermost of which are separated at their lower edges to form an opening or slot 7, through which wet or dry feed may be poured into the subjacent lower or hog trough 8. Connecting the base bars of the two end frames at points adjacent to the inner edges of the uprights 4 are tie-bars 9, preferably angular in cross-section and set at an angle of forty-five degrees to a horizontal plane in order to present upper outer angles 10 and 11, and also to arrange their upper and outer surfaces in the planes, respectively, of the inner surfaces of the slats 6, as shown clearly in Fig. 3. Braces 12 are secured to the inner surfaces of the slats 6 and extend below the bottom of the rack, and are secured to said outer upper surfaces of the tie-bars 9, thus supporting the intermediate portions of said tie-bars and strengthening the slats 6 by connecting them for mutual support. Connecting the lowermost slats of the rack with the tie-bars 9 at points between said braces 12, and with said braces dividing the entire length of the structure into spaces of equal size, are the partition-rods 13, preferably constructed of heavy wire doubled upon itself at its center, the loop 14 being connected with an eye or staple on the tie-bar 9 and the loose ends with a similar staple or eye 15 on the lowermost slat at a point vertically over the staple or eye 14.

Inasmuch as stock in feeding invariably press upon the uppermost slats of a rack and upon bars, such as tie-bars 9, and often depress such bars at their centers or between supports, I have found that the above-described partition-rods 13 form convenient means for strengthening the structure and causing mutual interdependence of the parts. By twisting these partition-rods they are contracted in length, and they may be twisted and thus adjusted to any desired extent by inserting a lever at a point 16 between the sides or parts of the wire composing a rod and turning the same in a plane perpendicular to the rod. In this way the intermediate portions of the tie-bars are strained upwardly, and the braces 12 communicate the upward strain to the slats comprising the rack. Furthermore, these partition-rods may be tightened, when they become loose by reason of pressure of the stock, by the means above described. The tie-bars 9 are connected by the diagonally-disposed guard-rods 17, which are thus disposed in a plane above the upper edges of the trough 8 and prevent stock from pushing or crowding while feeding. These guard-rods may be formed, as shown in the drawings, of a continuous doubled wire, arranged in a zigzag position, and secured to the tie-bars by means of the same staples 14, which connect the lower ends of the partition-rods 13 thereto, and said guard-rods may be tightened by means similar to those above described in connection with the partition-rods, in order to draw the centers of the tie-bars inward in contact with the upper edges of the sides of the trough 8.

The ends 18 of the trough 8 are extended laterally to form sills which rest at their lower edges upon the ground or floor, and which are notched at their upper edges, as shown at 19, to receive the lower angles of the tie-bars 9. These sills are pivotally connected at one end to the base bars of the end frames by means of bolts 20, whereby the entire frame and rack may be tilted or inclined, as shown in Fig. 4, to expose the trough 8, said framework being held in its proper position with relation to the trough by means of the removable pins 21 engaging registering perforations 22 and 23, formed, respectively, in the base bars and sills. It will be seen that the trough may be used independently of the rack by removing the bolts which form the pivots, said trough having a base independent of the rack and consisting of the above-described sills. Also, the rack may be used independently of the trough, in which case hay or fodder or other long feed may be arranged in the space inclosed by the partition-rods 13 and guard-rods 17 for small stock.

Arranged in the intervals between the planes of the uprights 4 and the X-standards are the transverse bars 24, which may be secured in different horizontal planes by means of bolts 25 engaging registering perforations in said bars 24 and the uprights 4. Said transverse bars extend laterally beyond the uprights and also beyond the uppermost slats of the rack and are designed to support the auxiliary troughs 26, adapted for water and small feed. These auxiliary troughs are secured at their ends to the transverse bars by means of bolts or pins 27 engaging registering perforations in the ends or heads of the troughs and in the bars.

When the transverse bars are arranged in the position shown in Fig. 1 or in the plane approximately of the top of the rack, the auxiliary troughs are adapted particularly for the use of large stock in conjunction with the rack, whereas when said troughs are arranged in the position shown in Fig. 2 they are adapted also for the use of smaller stock, such as calves. In the latter position the auxiliary troughs are usually adjusted under the sides of the feed-rack in order to catch the short or broken feed which finds its way through the intervals between the fixed slats of the rack, and in order to facilitate this adjustment the transverse bars are preferably provided with a series of openings for the reception of the bolts or pins by which the troughs are secured thereto. When the auxiliary troughs are adjusted under the sides of the rack, as shown in Fig. 2, the bolts 25, by which the transverse bars 24 are secured to the uprights, may be utilized for holding the inner edges of the troughs. By removing the outer bolts or pins 27 the inner edges of the auxiliary troughs may be dropped, as shown in Fig. 3, to remove dirt or other foreign material which may have accumulated.

In order to close the intervals between the fixed slats of the rack to prevent short or broken feed from dropping upon sheep which may be feeding from the lower trough, I provide filling-slats 28, equal in width to the intervals between said fixed slats, bearing at their inner sides against the outer surfaces of the braces 12 and bars 5, and held in place by means of the turn-buttons 29, which are pivotally connected to the outer sides of intermediate fixed slats and overlap the filling-slats.

From the above description it will be seen that the lower trough is arranged in such a position with relation to the rack that feed may be poured through the opening or slot in the bottom of the rack and distributed evenly throughout the trough. It will be seen, furthermore, that the lower and auxiliary troughs combine, when the latter are arranged in their lowered positions, to catch short or broken feed which may be dropped from the rack, and thus avoid waste, in that such short or broken feed is in a position to be consumed by small stock and is prevented from being dropped upon and trodden into the ground. Furthermore, when desired the intervals between the fixed slats of the rack may be filled to protect sheep which may be feeding from the lower trough by preventing the falling of short feed, which becomes entangled with the wool and detracts from its value.

Inasmuch as the fixed slats are arranged horizontally, any desired number of filling-slats may be employed to close the intervals between the fixed slats either wholly or in part, as may be desired. For instance, the intervals near the bottom of the rack may be closed while those at the top may be left open, and the construction of the securing devices is such that any desired number of the filling-slats may be fastened thereby.

Various changes in the form, proportion, and the minor details of construction may be resorted to without departing from the spirit or sacrificing any of the advantages of the invention.

Having thus described my invention, I claim—

1. The combination with a rack for long feed having upwardly flared or divergent sides, of vertically adjustable transverse bars arranged at the ends of the rack and of greater length than the width of the rack at its top, means for temporarily securing said bars at the desired adjustment, troughs arranged parallel with the longitudinal center of the rack upon opposite sides thereof and removably secured at their extremities to the laterally projecting portions of said transverse bars, and means for adjusting the troughs upon the transverse bars toward and from the longitudinal center of the rack, whereby the inner sides of the troughs may be arranged at the desired proximity to the inclined sides of the rack at any adjustment of the transverse bars, substantially as specified.

2. The combination with a rack for long feed, of transverse-bars arranged at opposite ends of the rack, means for adjusting said bars vertically, troughs for water or short feed arranged parallel with and upon opposite sides of the rack, and bolts or pins for securing the ends of said troughs to the transverse-bars, said bolts or pins being adapted to engage perforations in the bars and a series of said perforations being provided whereby the troughs may be adjusted horizontally toward and from the rack, substantially as specified.

3. The combination of connected end frames having base and top bars and connecting uprights, said uprights being secured to the outer surfaces of the base and top bars, X-standards secured to the inner surfaces of the base and top bars of the frames and supporting a rack for long feed, said X-standards being thereby spaced from the planes of the uprights of the frames, transverse bars arranged in the intervals between the X-standards and the uprights of the frames, bolts for securing said transverse bars to the uprights and each bolt being adapted to engage one of a plurality of perforations in each upright, whereby said transverse bars may be vertically adjusted, troughs for water or short feed arranged parallel with the rack and supported at their ends by the transverse bars whereby the troughs may be adjusted vertically with the transverse bars, and means for adjusting the troughs horizontally toward and from the rack upon the transverse bars, substantially as specified.

4. The combination in a rack, of X-standards, horizontal slats secured permanently to the outer sides of said standards above their points of intersection and arranged at intervals to form intervening parallel-sided spaces, braces 12 secured to the inner surfaces of the said fixed slats, filling slats corresponding in width with the intervals between the fixed slats and adapted to be fitted therein with their inner surfaces in contact with the outer surfaces of said braces, whereby the braces form stops to limit the insertion of the filling slats, turn-buttons pivotally mounted upon the outer surfaces of the fixed slats and adapted to engage the filling slats to hold them in said positions, transverse bars arranged at the ends of the rack, means for adjusting said bars vertically, side troughs arranged parallel with and upon opposite sides of the rack and supported by said transverse bars, and means for adjusting said troughs horizontally upon the transverse bars to arrange them at the desired distances from the sides of the rack, whereby when the filling slats are removed the troughs may be arranged under the outwardly divergent sides of the rack to catch short feed dropping through the intervals, substantially as specified.

In testimony that I claim the foregoing as my own I have hereto affixed my signature in the presence of two witnesses.

CHARLES J. BOWLES.

Witnesses:
BARTON A. HOLLAND,
GEORGE WILSON.